US012649185B2

(12) United States Patent
Schudeleit et al.

(10) Patent No.: US 12,649,185 B2
(45) Date of Patent: Jun. 9, 2026

(54) METHOD FOR REMOVAL OF SUPPORT STRUCTURES OF ADDITIVE MANUFACTURED COMPONENTS BY PRESSURIZED JET

(71) Applicant: ACCELLERON SWITZERLAND LTD., Baden (CH)

(72) Inventors: Timo Schudeleit, Dübendorf (CH); Egon Seegers, Eschenbach (CH); Lukas Gampp, Schoenenbuch (CH); Felix Kaech, Baden (CH)

(73) Assignee: ACCELLERON SWITZERLAND LTD., Baden (CH)

( * ) Notice: Subject to any disclaimer, the term of this patent is extended or adjusted under 35 U.S.C. 154(b) by 544 days.

(21) Appl. No.: 18/017,804

(22) PCT Filed: Jul. 22, 2021

(86) PCT No.: PCT/EP2021/070513
§ 371 (c)(1),
(2) Date: Jan. 24, 2023

(87) PCT Pub. No.: WO2022/018197
PCT Pub. Date: Jan. 27, 2022

(65) Prior Publication Data
US 2023/0278107 A1        Sep. 7, 2023

(30) Foreign Application Priority Data
Jul. 24, 2020    (EP) ..................................... 20187700

(51) Int. Cl.
| | |
|---|---|
| *B22F 10/40* | (2021.01) |
| *B22F 5/04* | (2006.01) |
| *B33Y 40/20* | (2020.01) |
| *B33Y 80/00* | (2015.01) |

(52) U.S. Cl.
CPC ................ *B22F 10/40* (2021.01); *B22F 5/04* (2013.01); *B33Y 40/20* (2020.01); *B33Y 80/00* (2014.12)

(58) Field of Classification Search
CPC ......... B24C 1/04; B24C 1/045; B26F 1/3806; B26F 3/004; B23K 15/086; B28B 1/001; B22F 2003/1057
See application file for complete search history.

(56) References Cited

U.S. PATENT DOCUMENTS

| | | | |
|---|---|---|---|
| 2010/0170540 A1* | 7/2010 | Kritchman | ............. B33Y 40/20 |
| | | | 134/198 |
| 2015/0018995 A1 | 1/2015 | Weitzel et al. | |

(Continued)

FOREIGN PATENT DOCUMENTS

| | | |
|---|---|---|
| DE | 102017101835 A1 | 8/2018 |
| EP | 2910362 A1 | 8/2015 |

(Continued)

OTHER PUBLICATIONS

Office Action in connection to CN Application No. 202180061074. 4, dated Feb. 26, 2025.

(Continued)

*Primary Examiner* — Nicholas A Wang
(74) *Attorney, Agent, or Firm* — Meunier Carlin & Curfman LLC

(57) ABSTRACT

A method for manufacturing a vaned component of a turbomachine is provided. The method includes providing a base portion, additively manufacturing, on top of the base portion, a plurality of vanes and a plurality of support structures, the plurality of support structures having predetermined breaking points, additively manufacturing, on top of the plurality of support structures and the vanes, a top portion being supported by the plurality of support structures, whereby the vanes are sandwiched between the base (Continued)

portion and the top portion, and applying a pressurized jet to the plurality of support structures, thereby breaking the predetermined breaking points of the plurality of support structures and removing the plurality of support structures.

15 Claims, 7 Drawing Sheets

(56)                    References Cited

U.S. PATENT DOCUMENTS

| | | | |
|---|---|---|---|
| 2016/0175932 A1* | 6/2016 | Dimter | B29C 64/40 |
| | | | 219/76.1 |
| 2018/0169756 A1 | 6/2018 | Palys | |
| 2019/0022927 A1 | 1/2019 | Vial et al. | |
| 2019/0176403 A1* | 6/2019 | Hutchinson | B33Y 40/20 |
| 2020/0040739 A1* | 2/2020 | Notarnicola | F01D 5/048 |

FOREIGN PATENT DOCUMENTS

| | | | |
|---|---|---|---|
| EP | 3025810 | A1 | 6/2016 |
| EP | 3632596 | A1 | 4/2020 |
| FR | 3064519 | * | 10/2018 |
| FR | 3064519 | A1 | 10/2018 |
| JP | 2012-192679 | A | 10/2012 |
| JP | 2020-520827 | A | 7/2020 |
| WO | WO2012131481 | * | 10/2012 |
| WO | 2019021389 | A1 | 1/2019 |

OTHER PUBLICATIONS

International Search Report and Written Opinion in Application No. PCT/EP2021/070513, mailed Sep. 23, 2021, 16 pages.

Extended European Search Report in Application No. 20187700.8, dated Dec. 21, 2020, 9 pages.

Office Action in connection to Japanese Application No. 2023-504600, dated Dec. 3, 2025.

* cited by examiner

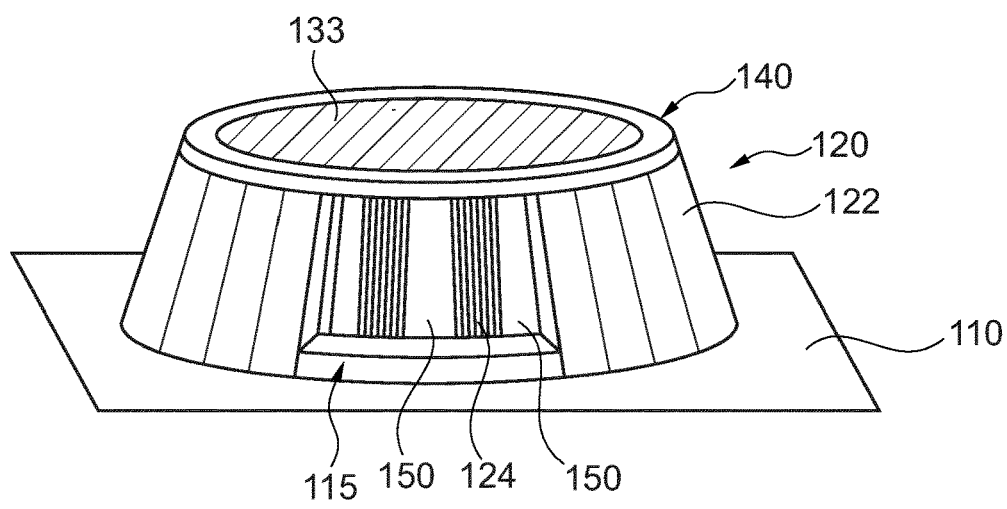
Fig. 3A
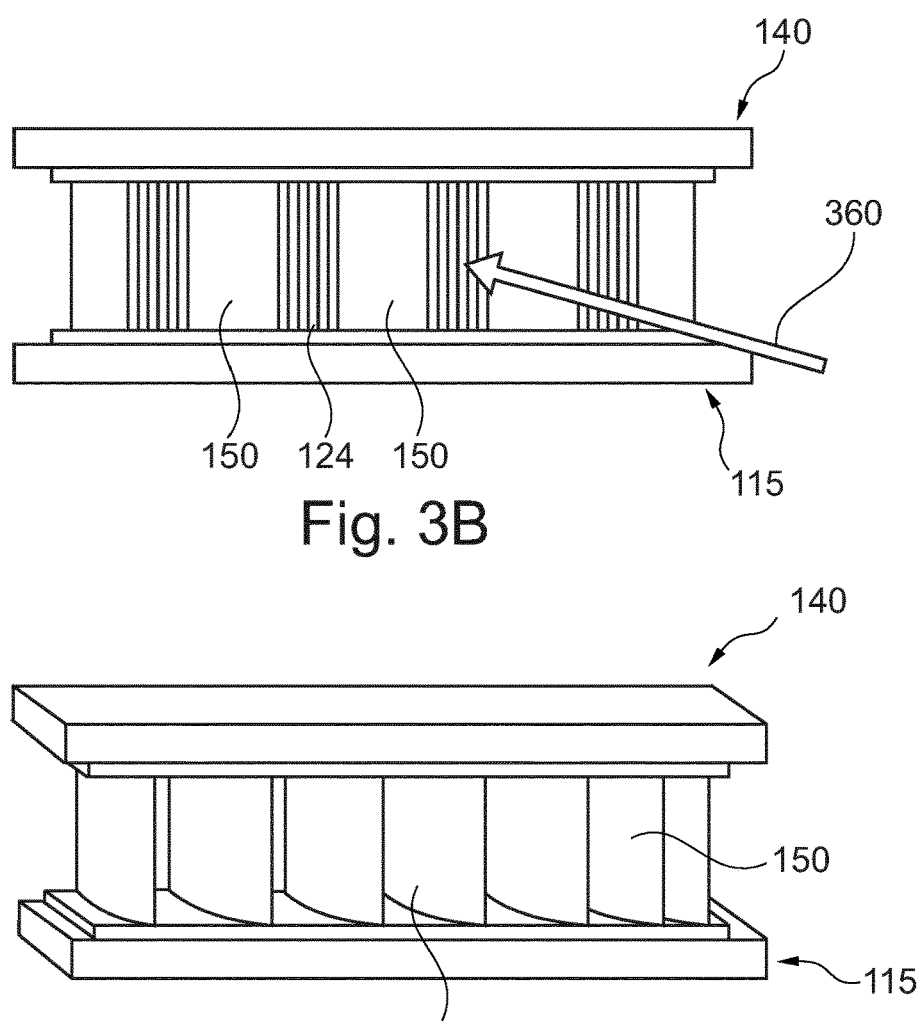
Fig. 3B
Fig. 3C

METHOD FOR REMOVAL OF SUPPORT STRUCTURES OF ADDITIVE MANUFACTURED COMPONENTS BY PRESSURIZED JET

FIELD OF INVENTION

The disclosure relates to the field of the production of manufacturing vaned components at least partly using additive manufacturing. Particularly, this disclosure relates to the finishing in a manufacturing process of the vaned component.

BACKGROUND

Additive Manufacturing (AM), also known as 3D printing, rapid prototyping or freeform fabrication, is the process of successively joining material to an object, typically layer upon layer, to produce a final component according to 3D model data, as opposed to subtractive manufacturing methodologies such as machining. The use of Additive Manufacturing (AM) with metal powders is relatively new and a growing industry sector. It became a suitable process to produce complex metal net shape parts, and not only prototypes as previously. Additive manufacturing enables new options for the design, prototyping and even serial production in all kinds of industries, such as aerospace, energy, automotive, medical, tooling and consumer goods.

Several techniques may be used for additional manufacturing, e.g. powder bed technologies. Typically, in a respective machine, a component (also referred to as final article or object) is built or formed by consecutively producing layers of sintered or molten material from a raw material being a fine powder. The powder typically includes a metal powder or a ceramic powder, or a combination of metal powder and ceramic powder. By applying energy with a highly focused laser or electron beam, the powder is locally strongly heated and thus, the single microscopic particles in the powder locally melt and stick together, or form a local melt pool. While building a component in metal with a powder bed fusion process, each element of the desired metal component typically needs to be supported by an element of a previous layer, and the entire object in progress needs to be supported during building. It is therefore typical to build the first layer on a build plate not belonging to the final component, the plate being subsequently removed after finishing the component.

Typically, a component is built directly on the build plate. Typically, support structures are used to stabilize overhanging areas of the component. In order to make an article easier to remove from the build plate after the end of the AM building process, it may be fully or partially built on support structures located between the build plate and the first (thus lowest) layer of the article or component.

As the support structures are not a part of the actual component which shall be produced, they have to be removed after the AM process is completed. The removal process may consume significant time and labor and is thus a cost factor, while also limiting the produced output of parts per time. The effort required for the removal procedure is typically dependent on the size, complexity and design of the individual produced component and the number and size of supports, as well as on the strength and ductility of the material.

As an example, document FR 3064519A1 describes jet cutting of cellular sacrificial portions of a blank.

As a further example, document WO2019021389 describes removal of supports inside a cavity of a 3D-printed object by hydraulic pressure.

Especially with respect to components that include poorly accessible, complex parts or sections, removal of the support structures can be extremely difficult. For example, the support structures need to be removed manually with a screw driver, tongs, hammer, hand milling cutter, hand grinder, etc. This is time consuming, costly and quality critical. Manual removal of the support structures thereby displays a bottleneck in the manufacturing process of the components.

Accordingly, there is a need for improvement in the manufacture by additive manufacturing.

SUMMARY

According to an aspect, a method for manufacturing a vaned component of a turbomachine is provided. The method includes providing a base portion, additively manufacturing, on top of the base portion, a plurality of vanes and a plurality of support structures, the plurality of support structures having predetermined breaking points. The method further includes additively manufacturing, on top of the plurality of support structures and the vanes, a top portion being supported by the plurality of support structures, whereby the vanes are sandwiched between the base portion and the top portion, and applying a pressurized jet to the plurality of support structures, thereby breaking the predetermined breaking points of the plurality of support structures and removing the plurality of support structures.

According to a further aspect, an apparatus for manufacturing a vaned component of a turbomachine is provided. The apparatus includes a first chamber comprising an additive manufacturing device for additive manufacturing a vaned component of the turbomachine having a plurality of support structures, a second chamber comprising at least one pressurized jet device for providing a pressurized jet to remove the plurality of support structures, and a controller being configured to carry out a method according to embodiments described herein.

Embodiments are also directed at apparatuses for carrying out the disclosed methods and include apparatus parts for performing each described method aspect. These method aspects may be performed by way of hardware components, a computer programmed by appropriate software, by any combination of the two or in any other manner. Furthermore, embodiments according to the present disclosure are also directed at methods for operating the described apparatus. It includes method aspects for carrying out every function of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following:

FIGS. 3A to 3C each show a schematic side view of a vaned component according to embodiments described herein;

DETAILED DESCRIPTION OF EMBODIMENTS

Figure 1:
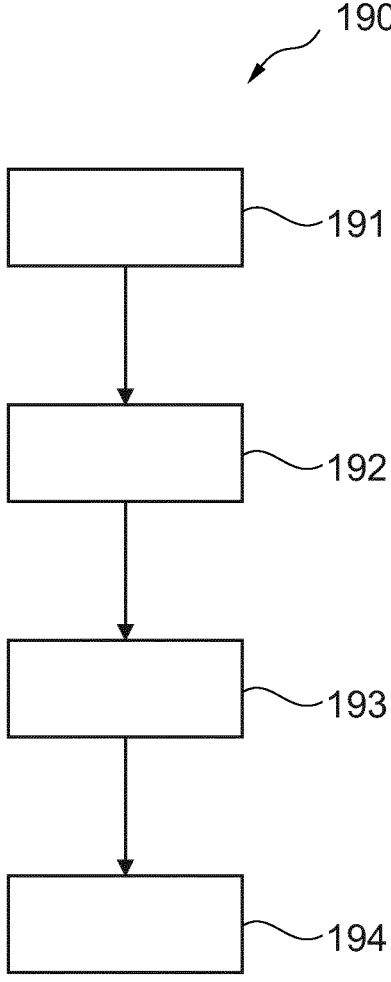
FIG. 1 shows a flow diagram of a method for manufacturing of a vaned component according to embodiments described herein.

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Within the following description of the drawings, the same reference numbers refer to the same components. Generally, only the differences with respect to the individual embodiments are described. When several identical items or parts appear in a figure, not all of the parts have reference numerals in order to simplify the appearance.

The systems and methods described herein are not limited to the specific embodiments described, but rather, components of the systems and/or steps of the methods may be utilized independently and separately from other components and/or steps described herein. Rather, the exemplary embodiment can be implemented and used in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

General Idea and Manufacture of the Vaned Component

The present disclosure relates to the manufacture of a vaned component for a turbomachine. Such components may include structures or elements that include poorly accessible, complex parts, and are therefore difficult to manufacture with conventional methods. For example, casting, molding, milling etc. of components and subsequent finishing applications can be time-consuming and may sometimes include drawbacks with respect to accuracy and accessibility. Accordingly, there is a demand for other technologies for the manufacture of such complex turbomachine components.

In particular, vanes of turbomachine components are difficult to manufacture since, compared to other elements of the components, the vanes may include cavities between each other making the vanes a hardly accessible part. It is therefore beneficial to at least manufacture vaned turbomachine components by additive manufacturing (AM) to provide for an accurate and precise shape of the component.

When manufacturing components additively, overhangs (overhanging parts) of the component need to be supported by so called support structures. Support structures can keep the overhangs in place and are therefore important. After the additive manufacturing process, the support structures need to be removed. For complex geometries, this is usually done manually with tools, which involves high costs and low repeatability.

Therefore, it is beneficial to improve the removal of the support structures. This is especially relevant for vaned components of turbomachines, as these components include structural elements difficult to manufacture and/or difficult to reach, which in turn creates particular challenges regarding the support structures and their removal.

According to embodiments that can be combined with any other embodiment described herein, a method 190 for manufacturing a vaned component of a turbomachine is provided. The method includes providing a base portion (step 191 in FIG. 1). The base portion may be a part of the vaned component. On top of the base portion, further parts of the vaned component may be formed or arranged. Accordingly, the base portion may be understood as the basis part of the vaned component that may serve as a starting point for the further manufacturing process. The base portion may delimit a vaned gas flow region. For example, the vaned gas flow region may be adapted for accommodating, during operation of the turbocharger, a working gas flow supplied to the manufactured vaned component, i.e. of the final manufactured turbocharger component.

Figures 2A, 2B:
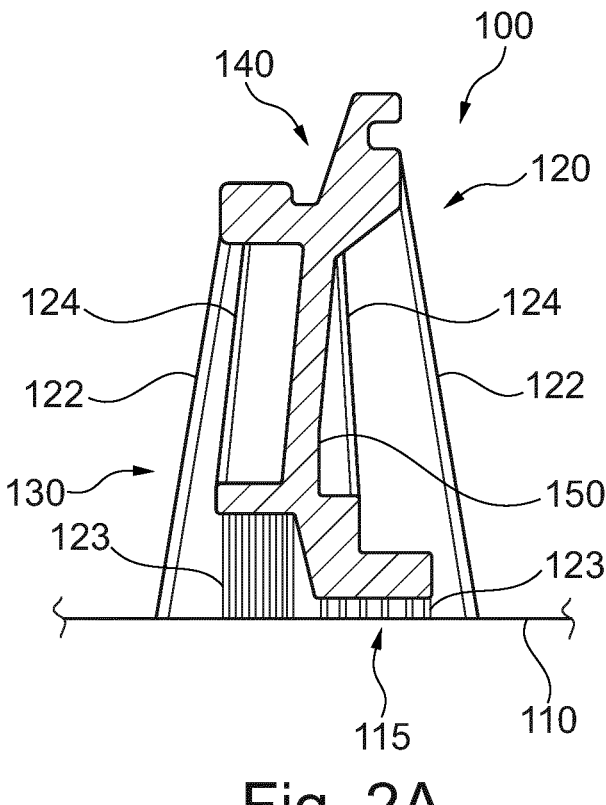
FIG. 2A shows a schematic cross-sectional view of a vaned component according to embodiments described herein.
FIG. 2B shows a schematic three-dimensional perspective view of the vaned component according to embodiments described herein.

The base portion according to embodiments described herein is exemplarily depicted in FIG. 2A. The base portion 115 may be provided on a build plate 110 from which it may be removed after manufacturing the vaned component. The base portion 115 may be provided on base support structures 123 on the build plate 110. The base support structures 123 may be manufactured by additive manufacturing. The base support structures may include bar-like or grid-like structures. Thereby, the vaned component can be easily removed from the build plate after manufacture of the vaned component.

The base portion 115 may be manufactured by additive manufacturing as described above and shown in FIG. 2A. In alternative embodiments, the base portion 115 may be pre-machined. According to embodiments that can be combined with any other embodiment described herein, the base portion 115 can be manufactured by any known manufacturing method including molding, milling, etc. For example, the base portion 115 may be a pre-machined base ring, e.g. ring machined by turning.

According to embodiments, the base portion 115 may be a ring structure. However, it is to be understood that the base portion 115 may also include other shapes like rectangles, parallelograms, ellipses, etc. Further, the base portion may include several shapes at once, i.e. the base portion may include a ring or circle as a basis structure and additional notches, protrusions and the like.

According to embodiments that can be combined with any other embodiment described herein, the method further includes additively manufacturing, on top of the base portion, a plurality of vanes 150 and a plurality of support structures (step 192 in FIG. 1). The plurality of vanes may include various numbers of vanes dependent on the component to be manufactured. For example, when manufacturing a nozzle ring, a number of vanes may be additively manufactured on top of the base portion. In embodiments, the number of vanes may be at least 5, preferably at least 10, and more preferably at least 15. On the other hand, the number of vanes may be at most 100, preferably at most 60, and more preferably at most 30. Between the vanes, a plurality of fluid channels may be provided. Particularly, between each of the vanes, one fluid channel may be provided in the final vaned component, A "final vaned component" or a "manufactured vaned component" may be understood as the vaned component after the support structures have been removed and/or the vaned component that is ready for use in a turbocharger. The fluid channel may accommodate a working gas flow in the manufactured vaned component. In other words, the working gas flow may flow through the plurality of fluid channels when the manufactured vaned component carries out its intended use in a turbocharger and/or turbocharger component. The plurality of support structures may extend in the plurality of fluid channels. For example, the plurality of support structures may traverse the plurality of fluid channels or the one fluid channel. The support structures may traverse the fluid channel from the top portion to the base portion or vice versa.

According to embodiments that can be combined with any other embodiment described herein, the plurality of support structures may include first support structures 124 and second support structures 122. The plurality of support structures may include various numbers of first and/or second support structures. Between each of the vanes 150, various first support structures 124 may be provided, e.g, by additive manufacturing. The first support structures 124 may be provided between the base portion and the top portion 140 of the vaned component, i.e. the first support structures 124 may be sandwiched between the top portion 140 and the base portion 115. Here, in FIG. 4A, a single first support structure 124 is shown between the vanes 150, but more generally a set of support structure(s), wherein the set may be one or more support structures may be provided here. The first support structures 124 may extend in the plurality of fluid channels. For example, the first support structures may traverse the plurality of fluid channels or one fluid channel. The first support structures may traverse the fluid channel from the top portion to the base portion or vice versa.

As used herein, the term "support structure", or "support(s)" is intended to mean a section of the (additively) manufactured component which is meant to stabilize overhanging areas of the component. The support structures are manufactured along with the component in consecutive layers. "Overhanging" is typically used to describe a surface of the component (during production) that has a normal vector pointing downwards, while the angle between the plane of the surface and the build plate (parallel to the earth surface) is typically smaller than about 45 degrees. The singular plural form "support structure" or "support" is typically intended to mean one continuous or coherent region supporting a certain face or part of the component being produced, while the plural form "support structures" typically means the plurality of such, usually spatially separated, regions used while producing a component. The supports reinforce the already produced portion(s) or parts of the component against distortions caused by internal stresses occurring during the process. The supports are typically nearly always removed after the building process.

According to embodiments that can be combined with any other embodiment described herein, the method further includes additively manufacturing, on top of the plurality of support structures and the vanes, a top portion being supported by the plurality of support structures, whereby the vanes are sandwiched between the base portion and the top portion (step 192 in FIG. 1). Advantageously, the support structures may support the top portion. For example, the top portion may include overhangs e.g. protrusions being supported by the support structures. Accordingly, manufacturing of the top portion, in particular additive manufacturing of the top portion of the component, can be facilitated.

According to embodiments that can be combined with any other embodiment described herein, the method may further include additively manufacturing, on the top of a build plate 110, the second support structures 122. The second support structures 122 may be provided between the build plate 110 and the top portion 140, i.e. the second support structures 122 may be sandwiched between the top portion 140 and the build plate 110. In other words, the first support structures 124 may support the top portion with respect to the base portion. The second support structures may support the top portion 140 with respect to the build plate 110. As exemplarily shown in the cross-sectional view of the vaned component 100 in FIG. 2A, the first support structures 124 and the second support structures 122 may be provided at radial sides of the vanes 150. The radial sides may include a side radially facing inside 130 and a side radially facing outside 120. The first support structures 124 and/or the second support structures 122 may be provided at the side radially facing inside 130 and/or the side radially facing outside 120. Additionally, or alternatively, at the side radially facing inside 130, a continuous support structure may be provided.

Advantageously, the support structures may hold overhangs of or between parts of the component during manufacturing. The support structures may be provided between different parts of the component, especially between sequentially formed sections i.e. between sections that are manufactured after and/or on top of one another. As an example, after forming the base portion 115 on the build plate 110, the vanes 150 may be formed by additive manufacturing. On top of the vanes, the top portion 140 may be formed by additive manufacturing. Between these two parts, i.e. between the vanes and the top portion, the plurality of support structures may be formed by additive manufacturing. It is to be understood that the vanes and the plurality of support structures may be formed simultaneously. Further, it is to be understood that the second support structures 122 may be formed simultaneously with the vanes and the first support structures 124. The top portion may be formed last.

According to embodiments that can be combined with any other embodiment described herein, the plurality of support structures has predetermined breaking points. Each of the support structures may have one or more predetermined breaking points, in particular, each of the support structures may have two predetermined breaking points. Each support structure of the plurality of support structures may include at least two predetermined breaking points at vertically opposing sides of the support structure. For example, a support structure may have a predetermined breaking point 125 at the top and one predetermined breaking point 125 at the bottom as is exemplarily shown in FIG. 4B and further described below.

The term "predetermined breaking point" as used throughout this disclosure may be understood as a defined section or geometrical area of the support structure where a fused material of the support structure is produced to be significantly, generally speaking, weaker than the material of the component itself or of other sections of the support structure. In other words, the predetermined breaking point may be understood as a defined section of the support structure that is designed to disconnect from the component and/or another part of the support structure, i.e. the section is prone to break when pressure is applied to the support structure. This can be achieved by, e.g., influencing the laser parameters so that the material of the support structures may be fused with a lower density, lower toughness, higher porosity, etc. than the material of the component or of other sections of the support structure itself. Additionally or alternatively, this can also be achieved by forming a tapered (e.g., cone-shaped) portion of the support structure, so that a tip portion of the tapered portion forms the predetermined breaking point. The predetermined breaking point may be formed between the main portion of the support structure and the top portion (overhang), and/or at a portion at which the support structure meets the top portion.

Pressure may be applied for removing the support structures. Advantageously, the support structures including the predetermined breaking points may be provided such that a force for removing the support structures can be provided over an entire area of the support structure. In other words, the force e.g. pressure in form of a pressurized jet for removal of the support structures does not need to be provided directly to the predetermined breaking points. Accordingly, the support structures according to embodiments may be removed integrally from the produced component. This means that the support structures are removed as a whole or set of predefined sub-sections, while leaving their outer shape substantially or completely intact, with the exception that it may be bent—while only the predetermined breaking point being adjacent to the component, is disrupted or partially destroyed. Accordingly, the person skilled in the art may understand that by using support structures having predetermined breaking points, the support structure may be removed as a whole. Accordingly, removal of the support structures may not be dependent on jet cutting the material but may be pushed away from the vaned component by a force being applied to the support structure. As a general preferred aspect, removal of the support structures may be achieved by deformation induced breaking (as opposed to material removal by jet cutting, thus according to an aspect, removal of the support structures is not achieved by jet cutting). When applying pressure to the support structures, the material at the predetermined breaking points may yield and break such that the support structure can be removed.

The method further may include removal of the vaned component from the build plate 110. FIG. 2B is an exemplary depiction of the vaned component 100 when (additive) manufacturing of the parts of the component is finished and before the vaned component is removed from the build plate. Removing of the vaned component from the build plate may include removing by a pressurized jet, manual removal with hand tools and/or removal by machining.

According to embodiments, the second support structures 122 may surround the vaned component and may be removed first. The second support structures may be arranged at the side radially facing inside 130 and/or the side radially facing outside 120. The second support structures may be removed manually from the vaned component, e.g. with hand tools like screw drivers, tongs, hammer, hand milling cutter, hand grinder and the like. Additionally, or alternatively, the second support structures may be removed by machining or by applying a pressurized jet as further described below.

According to embodiments that can be combined with any other embodiment described herein, the second support structures 122 may be segmented, angled lateral support bars. The support bars may be arranged next to each other in a circumferential direction around the vaned component. Each second support structure may include a radially protruding segment at the bottom, i.e. a segment that extends in a radial direction away from the vaned component. The radially protruding segment may be a radially inwardly protruding segment or a radially outwardly protruding segment. Also, second support structures with radially inwardly protruding segments and second support structures with radially outwardly protruding segments may be provided. Thus, the second support structures may be easily accessible and removable from the vaned component. The second support structures may be pulled away from the vaned component by acting with a pulling force and/or a bending moment on the radially protruding segment and thus be removed from the top portion 140 and the vaned component 100. Accordingly, the second support structures may be removed manually with hand tools, with a pressurized jet as further described below and/or by machining.

FIG. 3A exemplarily shows a vaned component with a few of the second support structures 122 removed. As can be seen in FIG. 3A, once the second support structures are removed, the base portion 115, the vanes 150 and the first support structures 124 may be revealed from beneath. Instead of second support structures, at the side radially facing inside, the continuous support structure 133 may be provided and may be removed in the same way like the second support structures 124, e.g. manually with a hand tool.

According to embodiments that can be combined with any other embodiment described herein, the first supports structures 124 may be grid-like or bar-like arranged between the vanes 150. The first support structures 124 may be arranged in an angle corresponding to an angle of the vanes 150 with respect to the circumference of the vaned component, FIG. 3B shows a vaned component that has been removed from the build plate. For example, the vaned component may be removed manually from the build plate, e.g. by destroying the base support structures below the base portion 115 of the vaned component. It is to be understood that the plurality of support structures, i.e. the first support structures and the second support structures may be removed from the vaned component before or after the vaned component is removed from the build plate. For example, when using an apparatus for removing the plurality of support structures, it may be beneficial to leave the vaned component attached to the build plate for the removal process, as the plate can conveniently be fastened to the base of the apparatus employed for pulling out the support.

According to embodiments that can be combined with any other embodiment described herein, the method further includes applying a pressurized jet to the plurality of support structures, thereby breaking the predetermined breaking points of the plurality of support structures and removing the plurality of support structures (step 194 in FIG. 1). In FIG. 3B, the pressurized jet is depicted by arrow 360. In other words, the pressurized, et may be applied for removing the plurality of support structures from the vaned component.

Advantageously, applying a pressurized jet to the plurality of support structures can be adapted to the specific vaned component that is manufactured i.e. poorly accessible support structures that are necessary for adequate manufacture of the vaned component can effectively be removed at low cost and in shorter time compared to the methods described in the art.

According to embodiments that can be combined with any other embodiment described herein, the pressurized jet may be applied to the second support structures 122 and/or the first support structures. Any description of applying the pressurized jet herein may be applicable to the second support structures and the first support structures unless explicitly described otherwise.

According to embodiments that can be combined with any other embodiment described herein, the pressurized jet may be applied by periodically altering a pressure of the pressurized jet for generating a pulsed pressurized jet. Advantageously, the plurality of support structures may be targeted repeatedly such that the predetermined breaking points i.e. the material at the predetermined breaking points may yield over the time where the pressurized jet is applied to the support structures. This may also beneficially shorten the overall application time by wearing down the connections between the support structures and the vaned component.

According to embodiments that can be combined with any other embodiment described herein, the pressurized jet may be a pressurized fluid jet. For example, may be a pressurized liquid jet, in particular a pressurized water jet. It is to be understood that any other fluid that can be compressed may be used. According to embodiments, the pressurized jet may include abrasive particles and/or one or more additives, the one or more additives being selected from the group consisting of additives for impacting the viscosity, additives for impacting the durability of the fluid jet and anti-corrosion agents and/or combinations thereof. Advantageously, the jet can be adapted according to the material of the support structures and can be specifically enhanced.

According to embodiments that can be combined with any other embodiment described herein, the pressurized jet, particularly the pressurized fluid jet can be applied in a volume flow of between 1 l/min and 50 l/min, particularly in a volume flow of between 15 l/min and 35 l/min, more particularly in a volume flow of 25 l/min. The volume flow may be selected according to the material to be removed.

According to embodiments that can be combined with any other embodiment described herein, the pressurized jet may be applied with a jet velocity of between >150 m/s and <1000 m/s, particularly with a jet velocity of between >200 m/s and <950 m/s. The jet velocity may be selected according to a material of the plurality of support structures.

The following table gives examples for specific jet velocities depending on the material of the plurality of support structures.

| Material of the support structure | Tensile strength Rm [MPa] | Pressure difference [bar] | Jet velocity [m/s] |
|---|---|---|---|
| 316L (1.4404) | 640 | 400 | 300 |
| AlSi10Mg (3.2382) | 460 | 200 | 200 |
| Ti64 (3.7164) | 1050 | 550 | 350 |
| Alloy 625 (2.4856) | 950 | 1200 | 500 |
| Alloy 718 (2.4668) | 1200 | 4500 | 950 |

In the above table, the material is defined by the known material numbering scheme according to the respective DIN/ISO/ASTM standards, and the pressure difference is the overpressure of the fluid in the nozzle (difference between the fluid pressure before exiting through the nozzle and the atmospheric pressure). Thus, it can be seen from the table that preferred pressure differences of the jet are at least 150 bar, preferably at least 200 bar and at most 5000 bar, preferably at most 4500 bar. Further, preferred jet velocities are at least 100 m/s, preferably at least 200 m/s, and up to about 1000 m/s.

According to embodiments that can be combined with any other embodiment described herein, the pressurized jet may be applied manually, automatically and/or adaptively controlled by a robot. For example, the pressurized jet may be applied with a hand-held nozzle. Furthermore, the pressurized jet may be applied by an apparatus according to embodiments described herein.

According to embodiments that can be combined with any other embodiment described herein, the manufactured vaned component may have a circular shape. FIG. 3C exemplarily shows a vaned component where all the support structures, i.e. the first and the second support structures have been removed after (additively) manufacturing the parts of the vaned component, i.e. the base portion, the vanes, the plurality of support structures and the top portion. Accordingly, FIGS. 3A to 3C show the development of the vaned component during the method for manufacturing according to embodiments described herein, and specifically during the support structure removal process step.

The vaned component may define an axis that may extend essentially vertical. The axis may be a circular axis, i.e. the axis may extend through the circle center of the vaned component in an essentially vertical direction. The vaned component may extend in a essentially vertical direction around the circular axis of the circular shape. The term "essentially vertical" as used herein may be understood as the direction perpendicular to a horizontal direction, i.e. the direction extending in a 90° angle from the horizontal direction. However, it is to be understood that "essentially vertical" may also include a direction ±30° from the vertical direction i.e. an angle between 60° and 120° with respect to the horizontal direction. For example, the vaned component may be a turbine wheel, a nozzle ring, a compressor wheel and a compressor diffuser.

According to embodiments, the vaned component may include a base portion 115 and a top portion 140. The base portion 115 and the top portion 140 may have a ring-like geometry. The ring-like geometry may be arranged around the essentially vertical axis. The vaned component may include a diameter and a radius, the radius being constant in each horizontal direction from the essentially vertical axis. In other words, the base portion 115 and the top portion 140 may be annular and concentric about the axis and spaced apart from each other in the axial direction. As an example, the base portion and the top portion may be the bottom and top boundaries of a nozzle ring.

According to embodiments that can be combined with any other embodiment described herein, the base portion 115 and/or the top portion 140 may include notches and/or protrusions. The protrusions may extend radially from the base portion and/or the top portion. For example, the notches and/or protrusions may extend inwardly, i.e. towards the essentially vertical axis and/or the notches and/or protrusions may extend outwardly, i.e. away from the essentially vertical axis. The top portion may extend farer out- and/or inwardly compared to the base portion or vice versa. Thus, overhangs may be formed. The protrusions may be regarded as overhangs of the vaned component.

According to embodiments that can be combined with any other embodiment described herein, the vaned component may include one or more vanes 150. The vanes may be arranged between the base portion and the top portion of the vaned component i.e. the vanes may be sandwiched between the base portion 115 and the top portion 140 of the vaned component. The vanes 150 may be tilted in a circumferential direction of the vaned component as exemplarily depicted in FIGS. 3C and 4A. In other words, the vanes may be disposed circumferentially and may extend from the bottom to the top portion. The vanes 150 may be structures where a flow of liquid may be applied.

According to embodiments that can be combined with any other embodiment described herein, the vaned component or parts of the vaned component may be additively manufactured from any one of the list comprising a steel powder, a titanium powder, a titanium alloy powder, a nickel-based alloy powder (e.g. Inconel®), an aluminum powder, an aluminum alloy powder, and combinations thereof. In particular, the vanes, the support structures and the top portion may be additively manufactured.

Figures 4A, 4B:
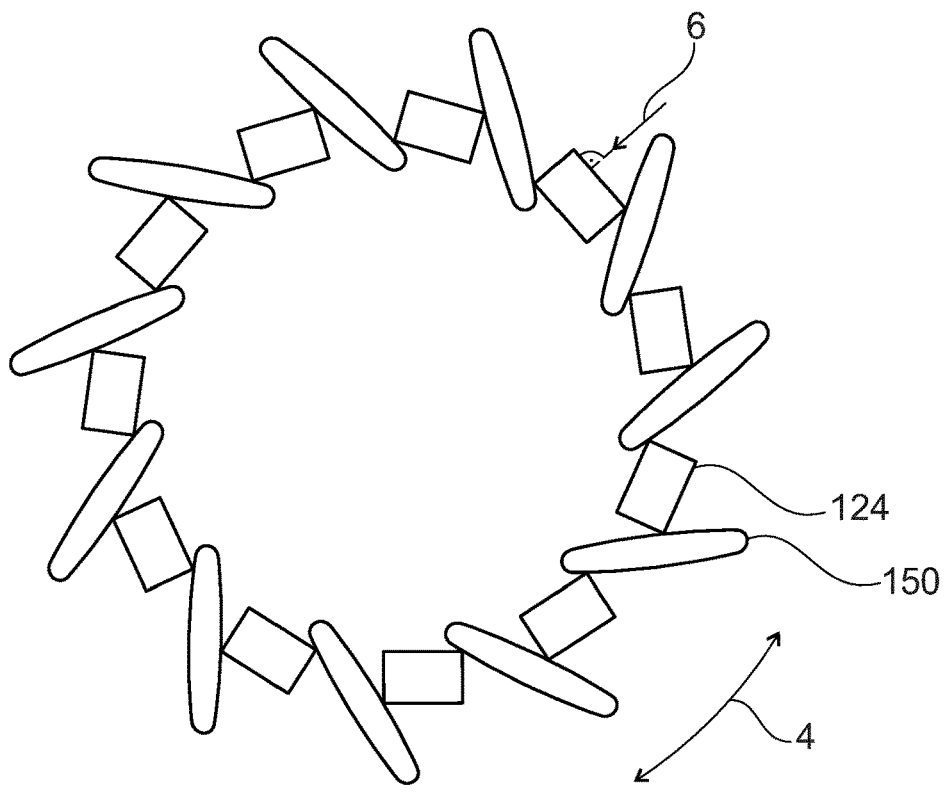
FIG. 4A shows a schematic top view of a vaned component according to embodiments described herein.
FIG. 4B shows a schematic side view of a support structure according to embodiments described herein.

Turning back to the removal of the plurality of support structures and according to embodiments that can be combined with any other embodiment described herein and as exemplary depicted in the schematic top view of FIG. 4A, the vanes 150 and respective sets of the first support structures 124 may be provided in an alternating manner along the circumferential direction depicted by arrow 4. Thereby, next to each set of first support structure(s), a vane may be provided and vice versa, in circumferentially alternating order. In other words, each set of first support structure(s) is circumferentially sandwiched between two vanes. Thus, an effective support of the overhanging top portion in the space between the vanes may be ensured, which is particularly difficult to access. In FIG. 4A, the first support structures are provided at an overlapping radius with the vanes and circumferentially inbetween the vanes. In other embodiments, and differently from what is shown in FIG. 4A, (some of) the first support structures may be provided radially displaced (radially inwardly and/or outwardly) from the vanes. Thus, support of the top portion may be enhanced.

According to embodiments that can be combined with any other embodiment described herein, a jet may be applied to the plurality of support structures. The jet may be pressurized. The jet may be a jet of particles and/or liquid, e.g., a water jet. The jet is preferably applied essentially horizontally (with a main horizontal component and a negligible vertical component).

The jet may be applied from a radial direction (inward and/or outward), or from a (nonzero) angle relative to the radial direction. The application angle may depend on the respective support structure to be removed. As an example and as depicted in FIG. 4A by arrow 6, the application angle may be essentially (up to a tolerance of at most 30° or even at most 15°) orthogonal to a main surface (e.g., elongation direction of a horizontal cross section of a main portion) of the support structures. Depending on the arrangement of the vanes 150 the application angle of the pressurized jet may be adjusted essentially parallel to the vanes, or to a main orientation of a gap between the vanes, such that at least a portion of the jet is allowed to traverse the gap minimally obstructed by the vanes, and may push the support structures out of the gap.

In embodiments, the pressurized fluid jet may be applied to the first support structures with an angle relative to the radial direction, i.e. with a circumferential direction component, and preferably with the angle/circumferential direction component such that the direction of the jet corresponds to a flow stream direction defined by the vanes. The flow stream direction may be defined by a vane angle at the end of the vanes from which the jet is applied. Thus, the circumferential direction component may be in the same quadrant relative to the circumferential direction depicted by arrow 6, and may preferably be parallel up to a tolerance of 30°.

According to embodiments that can be combined with any other embodiment described herein, the pressurized jet may be applied to the plurality of support structures by periodically realigning a direction of the jet with the plurality of support structures for impacting different target points at the plurality of support structures. Accordingly, the position where the pressurized jet may hit one support structure may be altered such that the respective support structure can be removed more efficiently.

As exemplarily shown in FIG. 4B, the support structures include predetermined breaking points 125. Each support structure of the plurality of support structures may include at least two predetermined breaking points at vertically opposing sides of the support structure. The plurality of support structures may each have a top part, a bottom part and a main portion 126. The top part may be provided or formed adjacent to the top portion 140 of the vaned component whereas the bottom part may be provided or formed adjacent to the base portion 115 of the vaned component. The main portion may be provided between the top part and the bottom part in a vertical order. The main portion may be arranged between the predetermined breaking points. It is to be understood that the predetermined breaking points may also be provided as a disruption of the main portion. In other words, the main portion of the support structures may include various predetermined breaking points, e.g. dispersed over the main portion of the support structure.

The vaned component may define the (essentially vertical) axis. The main portion may be bar-like or grid-like with a horizontal cross-section, the horizontal cross-section being elongated with an axis of elongation being essentially normal to a direction from which the jet is applied. In other words, the elongated cross-section may define a (vertical, parallel to the axis) main plane and/or a pair of inward- and outward-facing faces for receiving the jet from a direction having a radial component which may be essentially normal to the main plane/to the faces. In other words, the main portion of the support structures may be oriented and may define a plane being targeted by the pressurized jet and extending in a direction essentially normal to a direction from which the jet is applied.

According to embodiments that can be combined with any other embodiment described herein, the pressurized jet may be applied with a radial direction component, and preferably with the radial direction component periodically alternating between being radially inwardly directed and radially outwardly directed.

According to embodiments that can be combined with any other embodiment described herein, the pressurized jet may be applied to the support structures for imparting an impulse onto the main portion 126 of the support structures, the impulse onto the main portion resulting in the breaking of the predetermined breaking points 125 arranged between the main portion and the top part and/or the bottom part of the support structures. Thus, the support structure may be pushed away by the pressurized jet and efficiently removed from the vaned component.

According to embodiments that can be combined with any other embodiment described herein, the support structures may include an outer side and an inner side. The outer side of the support structure may be understood as the side facing the pressurized jet, i.e. the side of the support structure that is aligned with the side radially facing outside of the vaned component or with the side radially facing inside of the vaned component. The inner side of the support structure may be understood as the side of the support structure facing the vanes of the vaned component. As the support structures, in particular the first support structures 124 may be arranged at the side radially facing outside of the vaned component and at the side radially facing inside of the vaned component, the inner side of the support structure may face the vanes from two opposing sides. The arrangement of the plurality of support structures, i.e. the arrangement of the first support structures 526, 536 and second support structures 528, 538 is further depicted in FIGS. 5A and 5B.

According to embodiments that can be combined with any other embodiment described herein, the pressurized jet may be applied to the plurality of support structures by alternatingly applying the pressurized jet to the outer side and the inner side of the plurality of support structures, thereby targeting the plurality of support structures at their outer side and at their inner side in an alternating manner. Advantageously, by targeting the support structures from different sides, breaking of the predetermined breaking points and yielding of the material of the predetermined breaking points can further be enhanced. Thus, the overall application time may be reduced and the removal of the support structures may be carried out more efficiently.

Figures 5A, 5B:
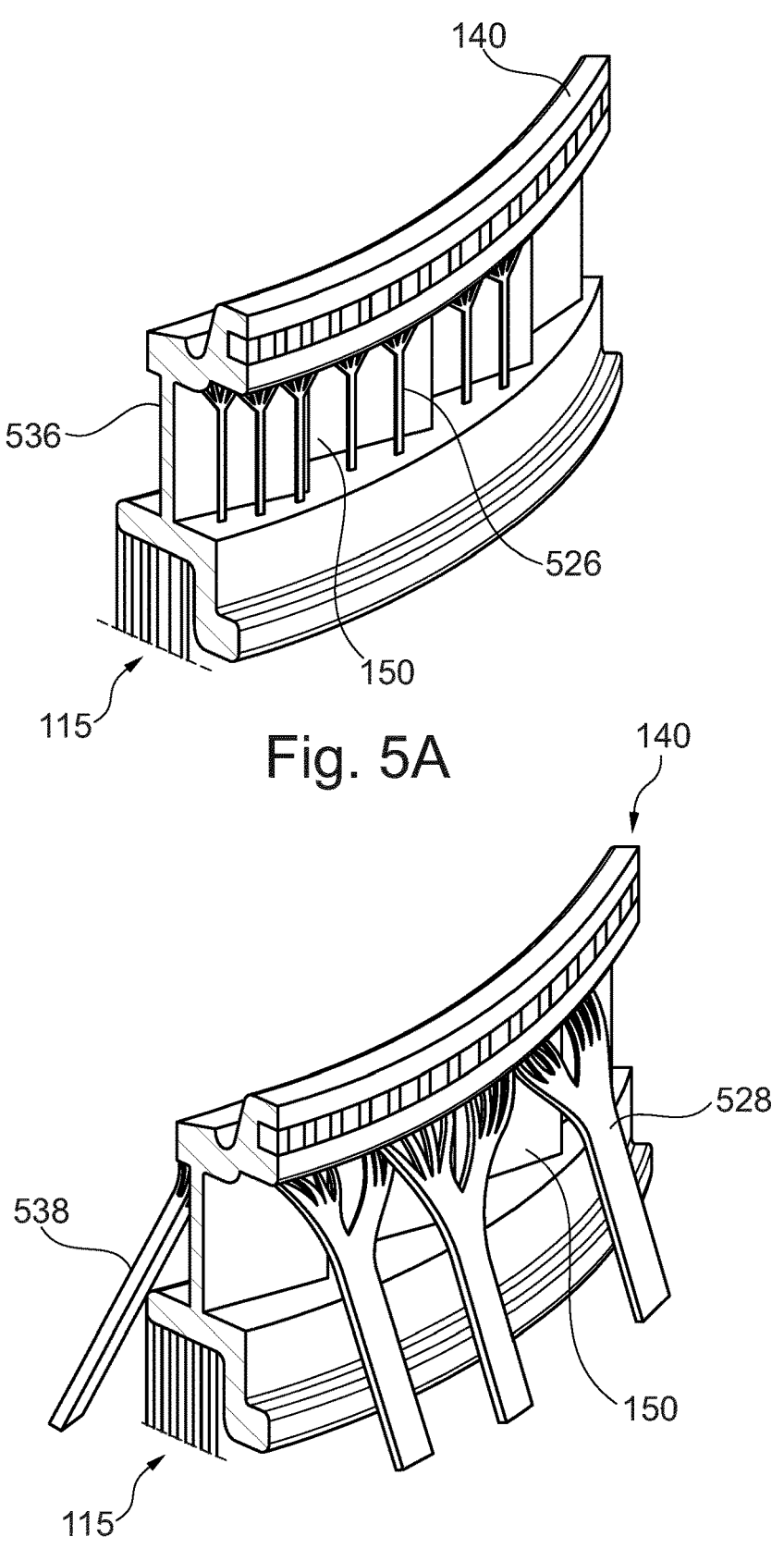
FIGS. 5A and 5B each show a schematic three-dimensional perspective view of a vaned component according to embodiments described herein FIGS. 6A and 6B each show a schematic side view of an apparatus according to embodiments described herein.

As exemplarily shown in FIGS. 5A and 5B and according to embodiments that can be combined with any other embodiment described herein, the plurality of support structures may include various shapes. As can be exemplarily seen in FIG. 5A, the first support structures 526 may include tree-like structures, i.e. the main portion of the first support structure may be relatively narrow may expand with respect to the top part of the support structure. The top part may include branch-like structures, each branch including a predetermined breaking point. The pressurized jet may be applied to the narrow part of the main portion and/or the branched part. According to embodiments, the second support structures 528 may also include narrow structures and branch-like structures as described.

According to embodiments that can be combined with any other embodiment described herein, the plurality of support structures may include a support angle. For example, the plurality of support structures may be formed at the vaned component with a specific angle with respect to the normal direction defined by the build plate (orthogonal to the build plate), such that accessibility of the support structures can be more easily provided. The support angle may be in the range between 10° and 45°, more particularly between 20° and 35°.

Advantageously, the branch-like structures may facilitate removal of the support structures even more since the predetermined breaking points may be distributed over a larger area but with less material that can yield and break more easily.

Figure 6A:
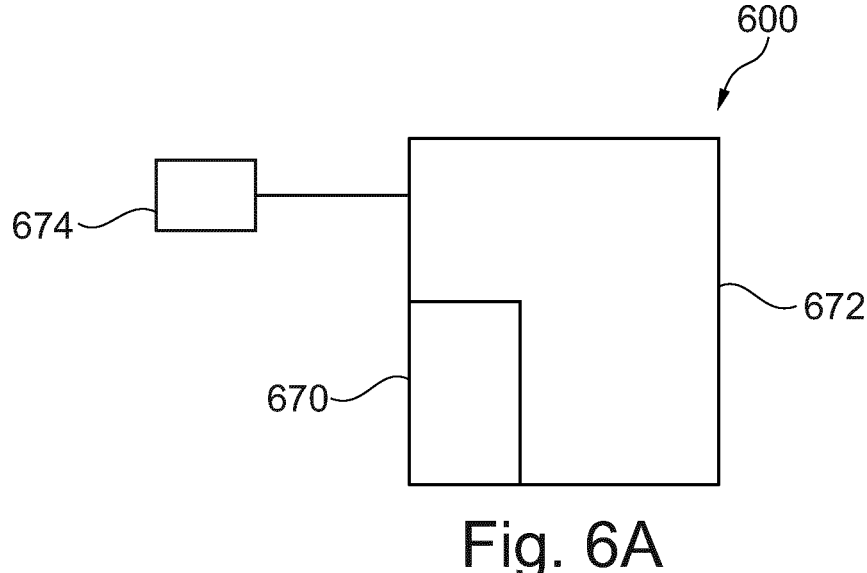
Figure 6B:
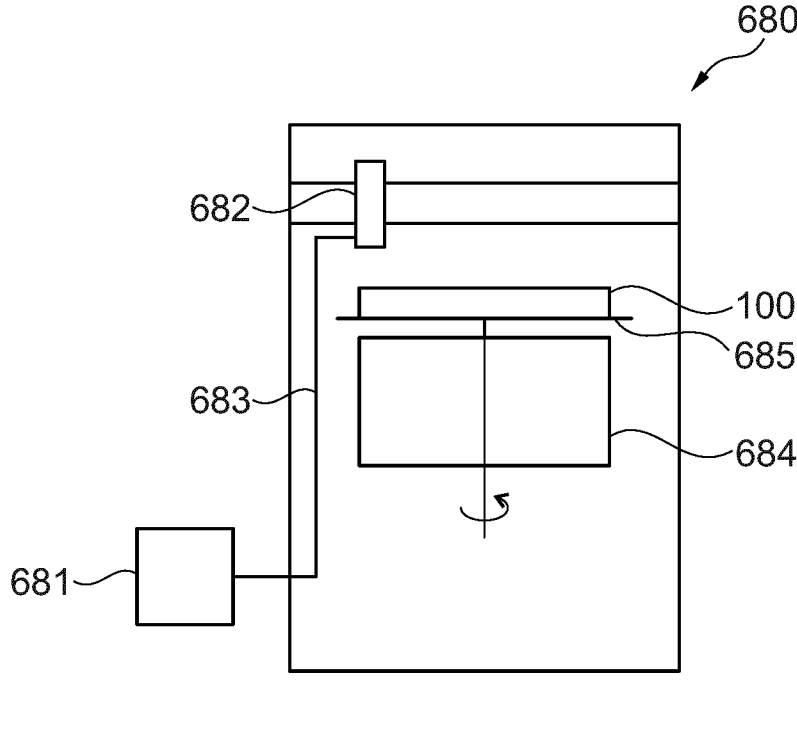

According to embodiments that can be combined with any other embodiment described herein and with exemplary reference to FIGS. 6A and 6B, an apparatus 600 for manufacturing a vaned component of a turbomachine is provided. The apparatus 600 includes a first chamber 672 including an additive manufacturing device 670 for additive manufacturing the vaned component of the turbomachine.

According to embodiments that can be combined with any other embodiment described herein, the additive manufacturing device 670 may be a device configured for carrying out a powder bed fusion process like e.g. a 3D printer. The additive manufacturing device may be controlled by a controller 672 such that various parameters can be set according to the component to be manufactured. For example, different 3D geometries for various components may be inputted into a computer system connected to the controller 674. The controller may regulate and alter the manufacturing conditions according to the design plan i.e. according to the component to be manufactured. Further, several parameters like layer thickness of the single layers to be fused, laser parameters, temperature, etc. may be controlled to obtain the desired component. According to embodiments, the controller 674 is configured to carry out the method according to any of the embodiments described herein, i.e. the controller may be configured to issue commands to carry out the method according to any of the embodiments described herein.

It is to be understood that a blank may be inserted into the first chamber 672 that may be further processed by an additive manufacturing technique. For example, the base portion can be inserted into the first chamber for additively manufacturing the further parts of the vaned component onto the base portion of the vaned component, like the vanes, the support structures and/or the top portion. According to embodiments described herein, the first chamber 672 may include a build plate for providing a support to the vaned component to be (further) processed in the first chamber.

According to embodiments described herein, the vaned component 100 may be transferred from the first chamber to the second chamber 680. The second chamber may be configured to remove the plurality of support structures from the vaned component 100. The vaned component may be transferred to the second chamber with or without the build plate used during additive manufacturing in the first chamber.

According to embodiments that can be combined with any other embodiment described herein and as exemplarily depicted in FIG. 6B, the apparatus includes a second chamber 680 including at least one pressurized jet device 682 for providing a pressurized jet to remove the plurality of support structures. The second chamber 680 may include a high-pressure pump 681 for generating the pressurized jet. For example, the high-pressure pump may be a liquid high-pressure pump for generating a pressurized liquid jet.

According to embodiments, the high-pressure pump may be connected to the pressurized jet device 682 by a high-pressure line 683 for providing the fluid or liquid jet to the pressurized jet device. The pressurized jet device may include one or more nozzles for applying the jet towards the produced vaned component i.e. towards the plurality of support structures for removing the support structures. The second chamber may further include a table 685 for supporting the vaned component 100 during removal of the plurality of support structures. The table 685 may be rotatable (indicated by the arrow in FIG. 6B) such that by moving the pressurized jet device and/or by rotating the table, different application angles of the pressurized jet may be provided towards the vaned component i.e. towards the plurality of support structures.

According to embodiments described herein, the second chamber may further include a collecting vessel 684 for collecting the removed support structure (material) and/or the fluid/liquid of the pressurized jet. The collecting vessel may further include a drain for easy cleaning of the apparatus.

It is to be understood that, although depicted in different figures, the apparatus may include the first and second chamber in direct spatial vicinity. Transfer of the vaned component between the chambers may occur in an automated manner. Further, the first and second chamber may also be spaced apart from each other. In such case, the vaned component may be transferred between the chambers manually.

According to embodiments that can be combined with any other embodiment described herein, the apparatus may include a detection device for automatically detecting respective positions of the first and/or second support structures such that the plurality of support structures may be removed in an automated manner. The detection device may be arranged in the second chamber. The detection device may be a camera, a laser, a barcode scanner, an infrared camera or the like. The detection device may be configured to selectively direct the pressurized fluid jet towards the determined positions, i.e. the detection device may be connected to the controller and which in turn may use the received data for controlling the pressurized jet device accordingly.

According to embodiments that can be combined with any other embodiment described herein, the commands issued by the controller may activate and/or deactivate the components of the apparatus for manufacturing a vaned component according to any of the embodiments described herein. Additionally or alternatively, the commands issued by the controller may regulate any of the components of the apparatus for manufacturing a vaned component according to any of the embodiments described herein. For example, by issuing commands, the controller may regulate a rotation of the table 685, a movement of the pressurized jet and/or movement of the detection device. Accordingly, the controller may issue commands to regulate operation of the apparatus, i.e. of the components of the apparatus for manufacturing a vaned component and/or instruct a user to carry out further steps. Any of the components and or devices described herein may be controlled by the controller.

Figure 7A:
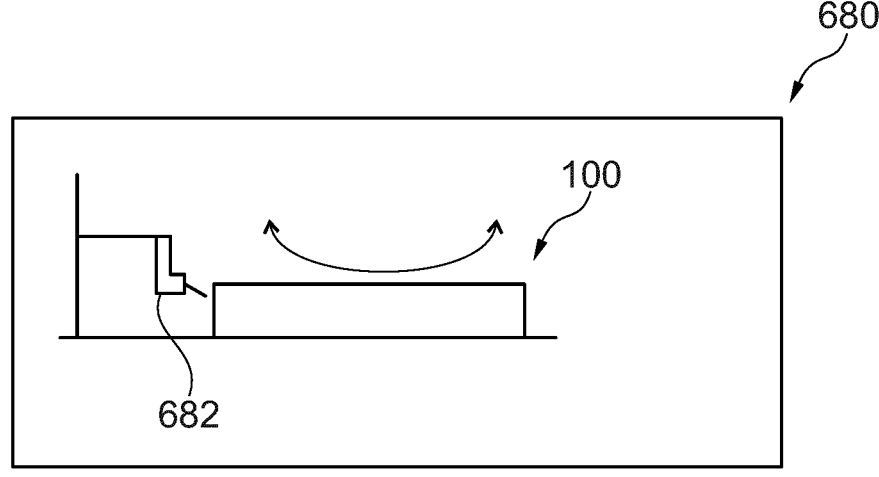
FIGS. 7A and 7B each show a schematic side view of an apparatus according to embodiments described herein.
Figure 7B:
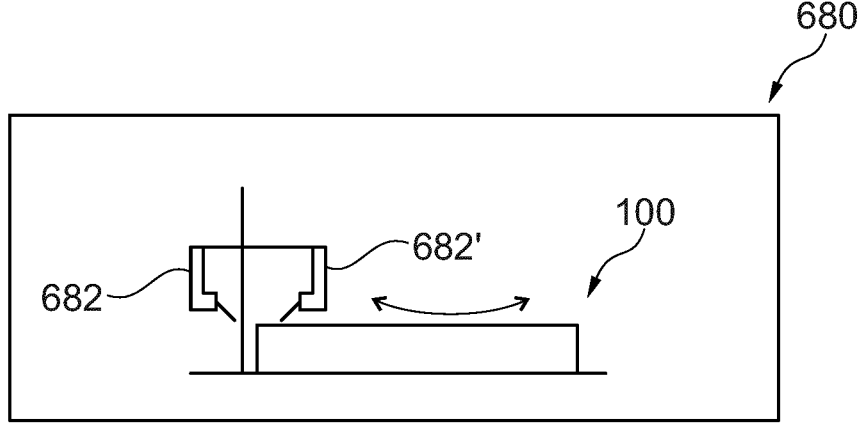

According to embodiments and with exemplary reference to FIGS. 7A and 7B, different embodiments of the second chamber 680, 680' are exemplarily provided. The second chamber may include all the features as described above. As can be seen in FIG. 7A, one pressurized jet device 682 may be provided. The pressurized jet device may include one high-pressure nozzle for directing the pressurized jet towards the vaned component, i.e. towards the plurality of support structures. The pressurized jet device may be provided at the side radially facing outside of the vaned component or at the side radially facing inside of the vaned component. Thus, different settings of the pressurized jet can be carried out as explained according to embodiments described herein. For example, one specific target point of the support structures may be targeted. Further, the pressurized jet device may be configured to change its position with respect to the vaned component. In other words, the pressurized jet device may be provided at the side radially facing outside and/or at the side radially facing inside depending from which direction the pressurized jet shall be applied for removing the support structures. The position of the pressurized jet device may also be chosen depending on the support structure to be removed, i.e. if a first support structure or a second support structure shall be removed.

Additionally, or alternatively, the second chamber 680' may include more than one pressurized jet device, for example, the second chamber may include two pressurized jet devices, a first pressurized jet device 682 and a second pressurized jet device 682'. Each of the devices may be positioned at one radial side of the vaned component 100, i.e. the first pressurized jet device may be provided at the side radially facing outside of the vaned component and the second pressurized jet device may be provided at the side radially facing inside of the vaned component. Thus, several applications of the pressurized jet may be provided. For example, the plurality of support structures may be targeted with the pressurized jet from both radial sides simultaneously or in an alternating manner as described according to embodiments herein.

In view of the above, it is to be understood that compared to the state of the art, embodiments of the present disclosure beneficially provide for a method and an apparatus for manufacturing a vaned component of a turbomachine which are improved with respect to the application of additive manufacturing and to the removal of support structures. Further, embodiments described herein beneficially provide for a more efficient removal and time effective manufacture of additively manufactured components compared to conventional methods and apparatuses.

While the foregoing is directed to embodiments of the disclosure, other and further embodiments of the disclosure may be devised without departing from the basic scope thereof, and the scope thereof is determined by the claims that follow.

The invention claimed is:

1. A method for manufacturing a vaned component of a turbomachine, the method comprising:
   providing a base portion, the base portion being part of the vaned component and serving as a starting point for manufacturing the vaned component;
   additively manufacturing, on top of the base portion, a plurality of vanes and a plurality of support structures, the plurality of support structures having predetermined breaking points;
   additively manufacturing, on top of the plurality of support structures and the vanes, a top portion being supported by the plurality of support structures, whereby the vanes are sandwiched between the base portion and the top portion; and
   applying a pressurized jet to the plurality of support structures, thereby breaking the predetermined breaking points of the plurality of support structures and removing the plurality of support structures, wherein applying the pressurized jet to the plurality of support structures comprises alternatingly applying the pressurized jet to an outer side that faces the pressurized jet and an inner side that faces the vanes of the vaned component of the plurality of support structures, thereby targeting the plurality of support structures at their outer side and at their inner side in an alternating manner.

2. The method according to claim 1, wherein the pressurized jet is applied to the support structures for imparting an impulse onto a main portion of the support structures, the impulse onto the main portion resulting in the breaking of the predetermined breaking points arranged between the main portion and the top of the support structures.

3. The method according to claim 1, wherein the plurality of support structures comprises first support structures and second support structures, wherein the first support structures are additively manufactured on top of the base portion so that the first support structures are sandwiched between the top portion and the base portion.

4. The method according to claim 3, wherein the second support structures are provided on a build plate, and wherein the method further comprises
   additively manufacturing, on the top of a build plate, the second support structures, so that the second support structures are sandwiched between the build plate and the top portion.

5. The method according to claim 3, wherein the second support structures are manually removed from the vaned component.

6. The method according to claim 1, wherein applying the pressurized jet comprises periodically altering a pressure of the pressurized jet for generating a pulsed pressurized jet.

7. The method according to claim 1, wherein applying the pressurized jet comprises periodically realigning a direction of the jet with the plurality of support structures for impacting different target points at the plurality of support structures.

8. The method according to claim 1, wherein the vaned component defines an essentially vertical axis, and wherein the support structures have a main portion with a horizontal cross-section, the horizontal cross-section being elongated with an axis of elongation being essentially normal to a direction from which the jet is applied.

9. The method according to claim 1, wherein applying the pressurized jet comprises applying a pressurized fluid jet in a volume flow of between 1 l/min and 50 l/min.

10. The method according to claim 1, wherein applying the pressurized jet comprises applying the pressurized jet with a jet velocity of between >150 m/s and <1000 m/s.

11. The method according to claim 10, wherein the jet velocity is selected according to a material of the plurality of support structures.

12. The method according to claim 1, wherein the vaned component is at least one selected from the group consisting of a casing, a turbine wheel, a nozzle ring, a compressor wheel and a compressor diffuser.

13. The method according to claim 1, wherein applying the pressurized jet to the plurality of support structures comprises one selected of the group consisting of applying the pressurized jet manually, automatically and adaptively controlled by a robot.

14. The method according to claim 1, wherein the pressurized jet is a pressurized fluid jet, in particular wherein the pressurized jet is a pressurized water jet.

15. Apparatus for manufacturing a vaned component of a turbomachine, the apparatus comprising:

a first chamber comprising an additive manufacturing device for additive manufacturing a vaned component of the turbomachine having a plurality of support structures;

a second chamber comprising at least one pressurized jet device for providing a pressurized jet to remove the plurality of support structures; and a controller being configured to issue commands to carry out the method according to claim 1.

\* \* \* \* \*